United States Patent [19]

Park

[11] Patent Number: 5,880,903
[45] Date of Patent: Mar. 9, 1999

[54] CASSETTE LOADING DEVICE IN A VIDEO CASSETTE RECORDER USING A PRESSING MEMBER HAVING A GEAR STRUCTURE

[75] Inventor: Ki-Young Park, Seoul, Rep. of Korea

[73] Assignee: Daewoo Electronics Co., Ltd., Rep. of Korea

[21] Appl. No.: 977,691

[22] Filed: Nov. 24, 1997

[30] Foreign Application Priority Data

Dec. 30, 1996 [KR] Rep. of Korea ................... 1996 78382

[51] Int. Cl.⁶ .................................................. G11B 5/008
[52] U.S. Cl. ........................................................ 360/96.5
[58] Field of Search ............................... 360/85, 93–96.6

[56] References Cited

U.S. PATENT DOCUMENTS

| | | |
|---|---|---|
| 4,979,061 | 12/1990 | Kishimoto et al. . |
| 5,349,482 | 9/1994 | Park . |
| 5,535,071 | 7/1996 | Yamagishi ............................ 360/96.5 |
| 5,600,508 | 2/1997 | Choi . |

FOREIGN PATENT DOCUMENTS 0 637 021 A2   7/1994   Japan .
2 232 806     12/1990   United Kingdom .

*Primary Examiner*—A. J. Heinz
*Attorney, Agent, or Firm*—Pennie & Edmonds LLP

[57] ABSTRACT

A video cassette recorder incorporating therein a cassette loading device for loading a manually inserted tape cassette to its operative position on a deck, of the type including a bracket on the deck having a "L" shaped slot formed therethrough, a slider pin fixed to a cassette holder and slidably retained in the slot, and a linkage lever rectilinearly movable having a rack at one end. Further, the device comprises a loading arm being engaged with the linkage lever and a pressing member including a pressing member pinion partially formed on the pressing member and engaged with the rack, a centripetal slot formed with the pressing member in such a way that it pivotally engages and depresses the slider pin when the loading arm pinion and the rack are disengaged from each other, an elastic part for elastically pressing the slider pin against the deck.

2 Claims, 4 Drawing Sheets

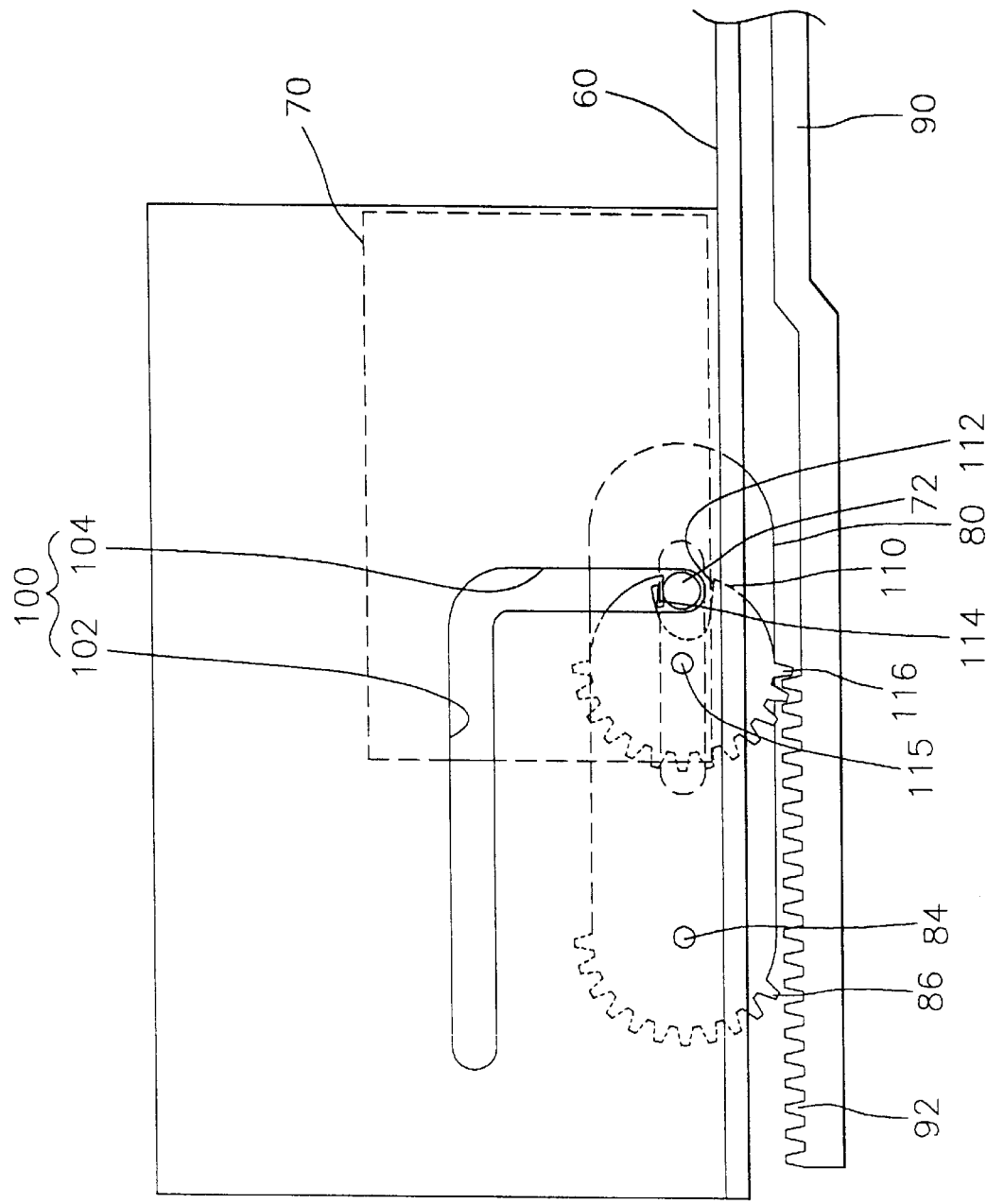

CASSETTE LOADING DEVICE IN A VIDEO CASSETTE RECORDER USING A PRESSING MEMBER HAVING A GEAR STRUCTURE

FIELD OF THE INVENTION

The present invention relates to a video cassette recorder ("VCR"); and, more particularly, to a cassette loading device capable of ensuring that a seated cassette holder on its operative position is stably maintained after a cassette has been loaded.

BACKGROUND OF THE INVENTION

A conventional video cassette recorder ("VCR") incorporates therein a cassette loading device for loading a manually inserted tape cassette to its operative position, and for unloading the loaded tape cassette therefrom. Typically, as shown in FIG. 1, the cassette loading device is provided with a cassette holder 20, a loading arm 30, a linkage lever 40, a bracket 12, and a deck 10.

The bracket 12 is mounted on the deck 10 and has a "L" shaped guide slot 50. The loading arm 30 is provided with a longitudinal slot 32, the longitudinal slot 32 having at one side thereof a cutout 33, a protrusion 38 integrally formed on one side of the loading arm 30, a shaft 34, a pinion 36 partially formed on the loading arm 30 to be engaged with the linkage lever 40, and a torsion spring 39. One end of the spring 39 is supported by the protrusion 38 and the other end of the spring 39 extends across the cutout 33. The shaft 34 protrudes perpendicularly from the center of rotation of the pinion 36 of the loading arm 30. The shaft 34 is rotatably supported by the bracket 12.

The cassette holder 20 is provided with a slider pin 22 fixed to the cassette holder 20 and slidably retained in the guide slot 50 and in the longitudinal slot 32.

The linkage lever 40 is provided with a rack 46 and a lever plane 42. The rack 46 engaged with the pinion 36 is formed on an end part of the linkage lever 40. The lever plane 42 is formed to the right side of the rack 46 on the linkage lever 40. A level of the lever plane 42 is higher than that of a top land of the teeth of the rack 46 on the linkage lever 40.

The linkage lever 40 translates a rotary movement of a motor(not shown) into a rotary movement of the loading arm 30 by traveling leftward rectilinearly, enabling the cassette holder 20 to move from a tape cassette receiving position toward the operative position.

In such a cassette loading device, however, after the tape cassette has been loaded, there is an additional rectilinear movement of the linkage lever 40, allowing the lever plane 42 to additionally rotate the loading arm 30 by pushing the last tooth 37 of the pinion 36. During the additional rotation of the loading arm 30, the slider pin 22 is stopped, when the cassette holder 20 is completely seated on the operative position, and then is resiliently depressed by the torsion spring 39. The resilient depression by the torsion spring 39 prevents the slider pin 22 from further moving or fluctuating.

However, the cassette loading device constructed in this manner has shortcoming in that if it is operated for a long time, the last tooth 37 and a portion of the lever plane 42 coming into contact with the last tooth 37 may become easily worn out due to the friction therebetween, decreasing the force being exerted on the torsion spring 39, which, in turn, reduces the effectiveness of the torsion spring 39.

SUMMARY OF THE INVENTION

It is, therefore, an object of the present invention to provide a VCR incorporating therein a cassette loading device capable of effectively maintaining a cassette holder in a stable condition after a cassette has been loaded in the VCR.

In accordance with one aspect of the present invention, there is provided a video cassette recorder incorporating therein a cassette loading device for loading a manually inserted tape cassette to its operative position on a deck, of the type including a bracket on the deck having a "L" shaped slot formed therethrough, a slider pin fixed to a cassette holder and slidably retained in the slot, and a linkage lever rectilinearly movable having a rack at one end, the device comprising: a loading arm for pressing the slider pin toward the operative position including a loading arm pinion partially formed on the loading arm and engaged with the rack, a longitudinal slot for retaining the slider pin therethrough; and a pressing member including a pressing member pinion partially formed on the pressing member and engaged with the rack, a centripetal slot formed with the pressing member in such a way that it pivotally engages and depresses the slider pin when the loading arm pinion and the rack are disengaged from each other, an elastic part for elastically pressing the slider pin against the deck.

BRIEF DESCRIPTION OF THE DRAWINGS

The above and other objects and features of the instant invention will become apparent from the following description of preferred embodiment taken in conjunction with the accompanying drawings, in which:

FIG. 4 depicts a side elevational view of a cassette loading device in a VCR using a pressing member having a gear structure in accordance with the present invention.

DETAILED DESCRIPTION OF THE PREFERRED EMBODIMENT

Figure 1:
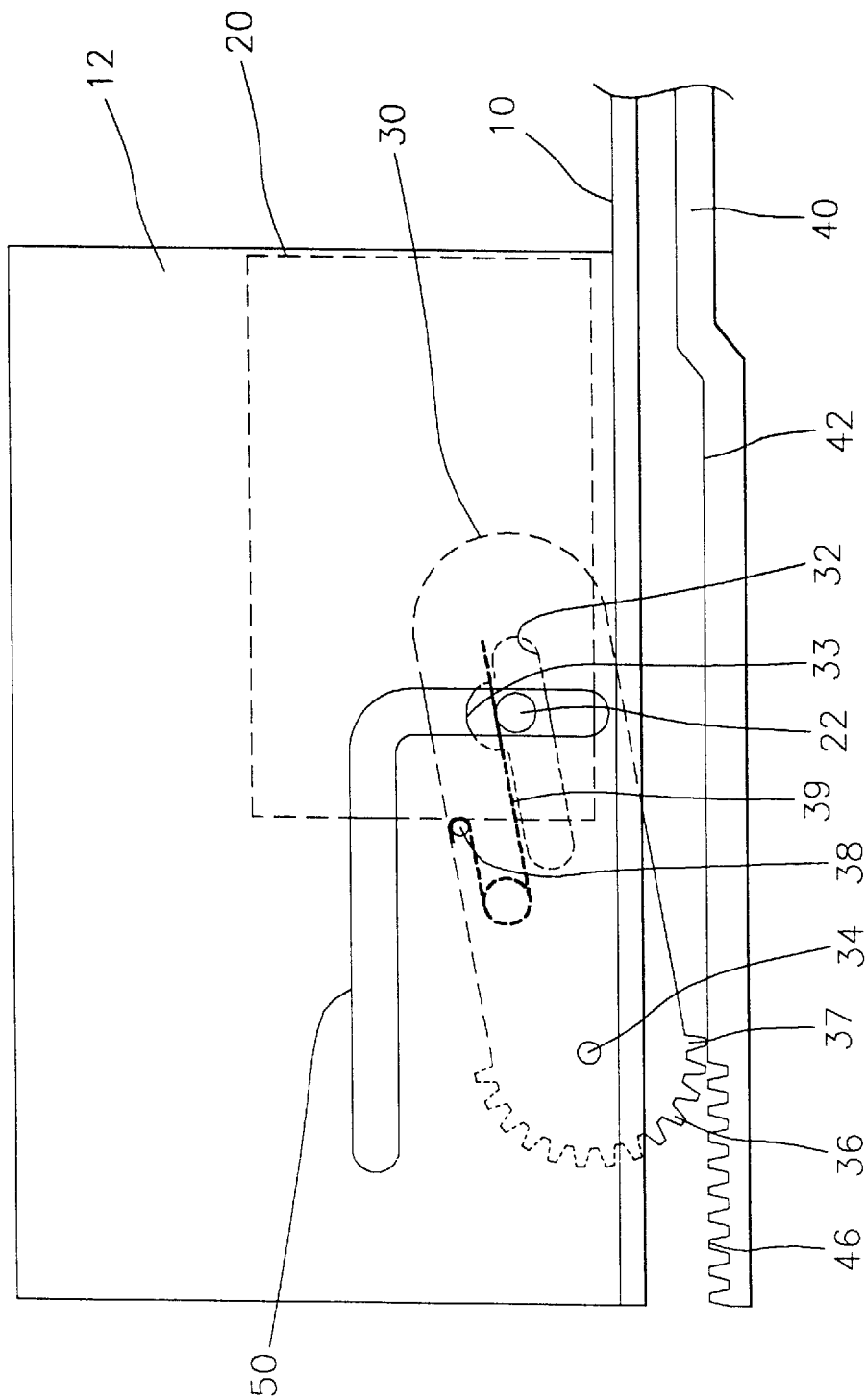
FIG. 1 illustrates a side elevational view of a prior art cassette loading device in a VCR.
Figure 2:
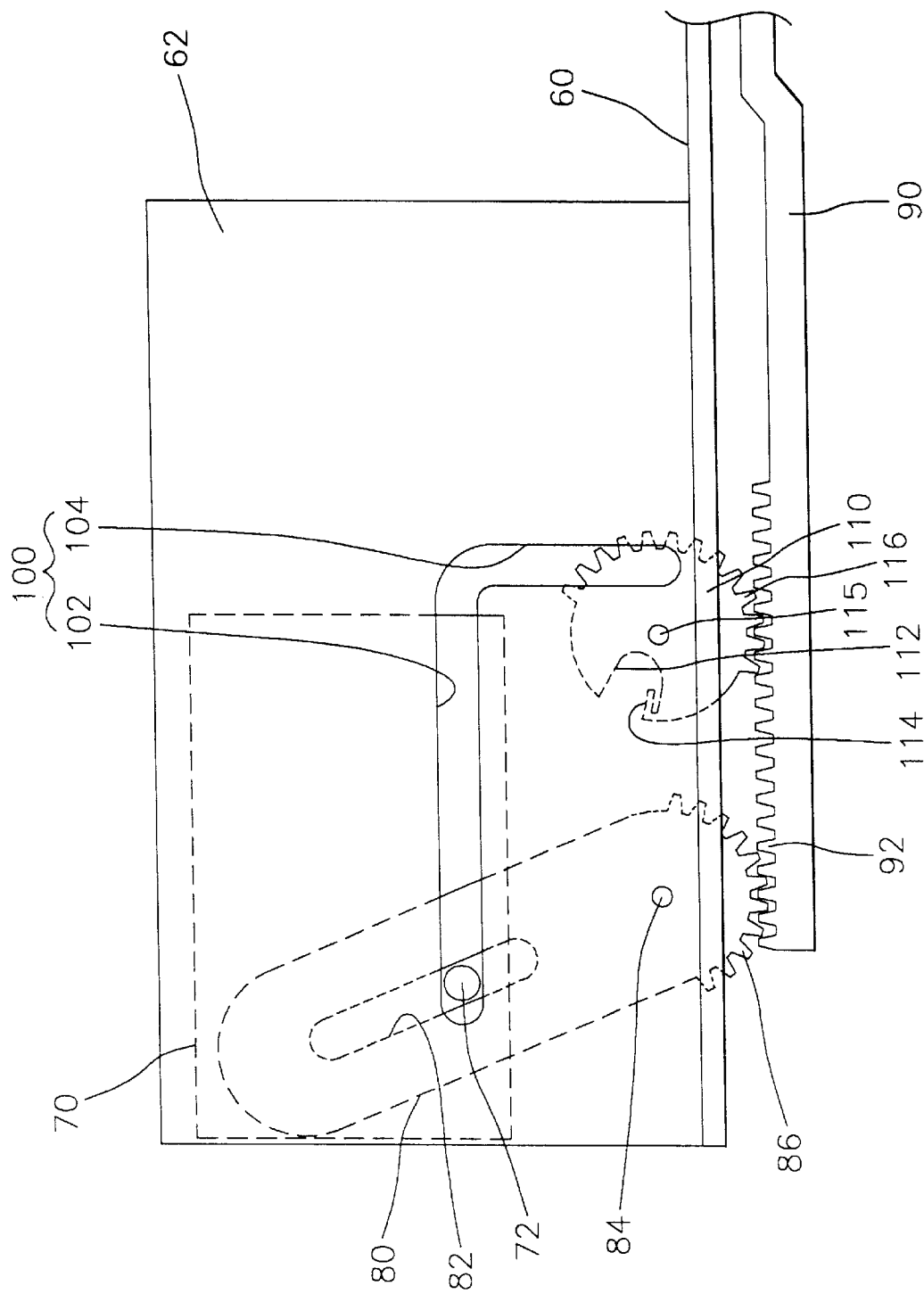
FIG. 2 shows a side elevational view of a cassette loading device in a VCR using a pressing member having a gear structure in accordance with the present invention.
Figure 3:
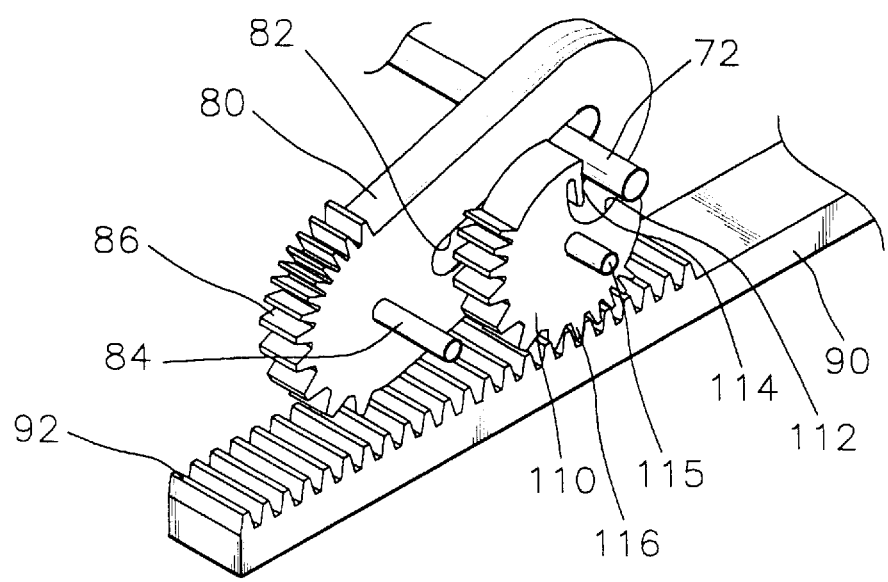
FIG. 3 describes a perspective view of a cassette loading device in a VCR using a pressing member having a gear structure in accordance with the present invention.

With reference to FIGS. 2 to 4, described below is a cassette loading device in a VCR in accordance with the preferred embodiment of the present invention. The inventive cassette loading device is provided with a cassette holder 70, a loading arm 80, a linkage lever 90, a bracket 62, a deck 60 and a pressing member 110 with a pressing member pinion 116 partially formed thereon.

The bracket 62 is mounted on the deck 60 and has a "L" shaped guide slot 100, the guide slot 100 being further divided into a horizontal portion 102 and a vertical portion 104.

The loading arm 80 is provided with a longitudinal slot 82, a shaft 84, and a loading arm pinion 86 partially formed on the loading arm 80 to be engaged with the linkage lever 90. The shaft 84 protrudes perpendicularly from the center of rotation of the loading arm pinion 86. The shaft 84 is rotatably supported by the bracket 62.

The cassette holder 70 is provided with a slider pin 72 fixed to the cassette holder 70. The slider pin 72 is slidably retained in the guide slot 100 and in the longitudinal slot 82.

A perspective view of the linkage lever 90 is disclosed on FIG. 3. As shown, made on the upper surface of the linkage lever 90 is the rack 92 wide enough to engage both with the loading arm pinion 86 and the pressing member pinion 116.

The pressing member pinion 116 is partially formed on a periphery of the pressing member 110. Substantially opposedly formed to the pressing member pinion 116 about the center of rotation of the pressing member 110 is a centripetal slot 112 for pivotally engaging the slider pin 72 thereinto. In the centripetal slot 112, an elastic member 114 protrudes from the pressing member 110. A shaft 115 protrudes at the center of rotation of the pressing member pinion 116 of the pressing member 110. The shaft 115 is rotatably supported by the bracket 62.

When a tape cassette(not shown) is inserted into the cassette holder 70 shown in FIG. 2, the cassette holder 70 is moved to its operative position in such a manner that the slider pin 72 fixed thereto is depressed by the rotation of the loading arm 80. The loading arm 80 is rotated by a motor(not shown) through the rack 92 of the linkage lever 90 and the loading arm pinion 86.

As shown in FIG. 3, the slider pin 72 moved by the loading arm 80 enters the centripetal slot 112 of the pressing member 110. At this moment, the last tooth of the loading arm pinion 86 departs from the rack 92. As a result, power transmission between the loading arm 80 and the linkage lever 90 does not occur allowing the pressing member 110 to pull the slider pin 72 along the vertical portion 104 of the guide slot 100.

After loading the tape cassette to the operative position on the deck 60, the linkage lever 90 makes an additional rectilinear movement for an additional rotation of the pressing member 110 and the elastic part 114 of the centripetal slot 112 deflects and elastically presses the slider pin 72, preventing the slider pin 72 from unnecessarily moving, leaving the cassette holder 70 more stably seated on the deck 60.

Although the invention has been shown and described with respect to the preferred embodiment, it will be understood by those skilled in the art that various changes and modifications may be made without departing from the spirit and scope of the invention as defined in the following claims.

What is claimed is:

1. A video cassette recorder incorporating therein a cassette loading device for loading a manually inserted tape cassette to its operative position on a deck, of the type including a bracket on the deck having a "L" shaped slot formed therethrough, a slider pin fixed to a cassette holder and slidably retained in the slot, and a linkage lever rectilinearly movable having a rack at one end, said device comprising:

a loading arm for pressing the slider pin toward the operative position including a loading arm pinion partially formed on the loading arm and engaged with the rack, a longitudinal slot for retaining the slider pin therethrough; and a pressing member including a pressing member pinion partially formed on the pressing member and engaged with the rack, a centripetal slot formed with the pressing member in such a way that it pivotally engages and depresses the slider pin when the loading arm pinion and the rack are disengaged from each other, an elastic part for elastically pressing the slider pin against the deck.

2. The VCR in claim 1, the linkage lever is wide enough to engage both with the loading arm pinion and with the pressing member pinion.

* * * * *